United States Patent
Marcy et al.

(10) Patent No.: US 9,418,563 B2
(45) Date of Patent: Aug. 16, 2016

(54) METHOD AND DEVICE FOR AUTOMATICALLY MANAGING THE SEPARATION BETWEEN TWO AIRCRAFT FOLLOWING ONE ANOTHER

(75) Inventors: Stéphane Marcy, Toulouse (FR); Oksana Medyna, Larra (FR); Sabine Vieyres, Toulouse (FR); Philippe Menard, Pibrac (FR); Jean-Christophe Guillermin, Toulouse (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 58 days.

(21) Appl. No.: 13/990,737

(22) PCT Filed: Dec. 1, 2011

(86) PCT No.: PCT/FR2011/052835
§ 371 (c)(1),
(2), (4) Date: May 30, 2013

(87) PCT Pub. No.: WO2012/072955
PCT Pub. Date: Jun. 7, 2012

(65) Prior Publication Data
US 2013/0261945 A1    Oct. 3, 2013

(30) Foreign Application Priority Data

Dec. 2, 2010  (FR) ..................... 10 60024

(51) Int. Cl.
*G08G 5/02*    (2006.01)
*G08G 5/00*    (2006.01)
(52) U.S. Cl.
CPC ............... *G08G 5/02* (2013.01); *G08G 5/0008* (2013.01); *G08G 5/0052* (2013.01); *G08G 5/0078* (2013.01); *G08G 5/025* (2013.01)

(58) Field of Classification Search
CPC ..... G05D 1/104; G08G 5/045; G08G 5/0008; G08G 5/02; G08G 5/0052; G08G 5/0078; G08G 5/025
See application file for complete search history.

(56) References Cited

U.S. PATENT DOCUMENTS 6,718,236 B1    4/2004  Hammer
2007/0061055 A1  3/2007  Stone
(Continued)

FOREIGN PATENT DOCUMENTS

FR    2 894 056    6/2007
FR    2 897 956    8/2007
(Continued)

OTHER PUBLICATIONS

International Search Report dated Jan. 25, 2012.
(Continued)

*Primary Examiner* — Fadey Jabr
*Assistant Examiner* — Basil T Jos
(74) *Attorney, Agent, or Firm* — Dickinson Wright PLLC

(57) ABSTRACT

The invention relates to a method and device for automatically managing the separation between two aircraft following one another. The device (1) comprises a means (6, 7) for automatically calculating, prior to performing a function to acquire and maintain separation, orders for controlling speed that enable a trailing aircraft to acquire and maintain a time separation relative to a target aircraft preceding the former.

15 Claims, 4 Drawing Sheets

(56) References Cited

U.S. PATENT DOCUMENTS

| | | |
|---|---|---|
| 2007/0222665 A1* | 9/2007 | Koeneman ............... 342/29 |
| 2008/0039986 A1 | 2/2008 | Winkler |
| 2008/0039987 A1 | 2/2008 | Winkler |
| 2008/0065279 A1 | 3/2008 | Winkler |
| 2008/0243314 A1 | 10/2008 | Ridenour |
| 2009/0125221 A1* | 5/2009 | Estkowski et al. ............ 701/120 |
| 2009/0171519 A1 | 7/2009 | Closse |
| 2009/0319101 A1 | 12/2009 | Coulmeau |
| 2010/0152996 A1 | 6/2010 | Blanchon |
| 2011/0066360 A1* | 3/2011 | Haissig .................. 701/116 |

FOREIGN PATENT DOCUMENTS

| | | |
|---|---|---|
| FR | 2 897 957 | 8/2007 |
| FR | 2 897 959 | 8/2007 |
| FR | 2 925 710 | 6/2009 |
| FR | 2 925 711 | 6/2009 |

OTHER PUBLICATIONS

French Written Opinion of the International Searching Authority dated Jan. 25, 2012 with English translation.

\* cited by examiner

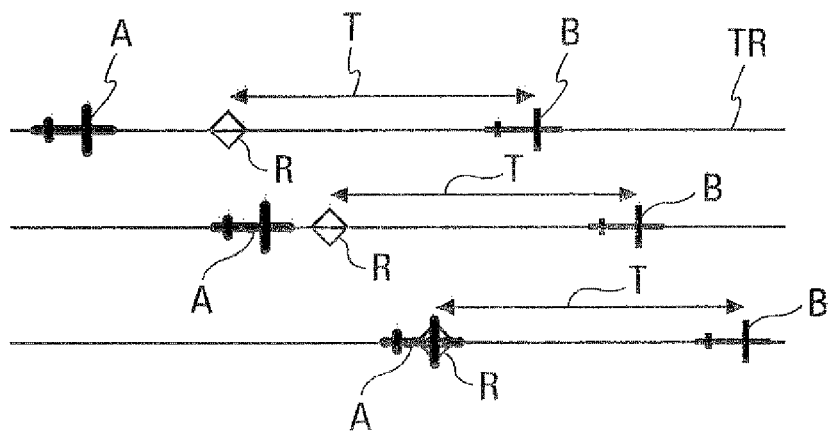
Fig. 2A
Fig. 2B
Fig. 2C
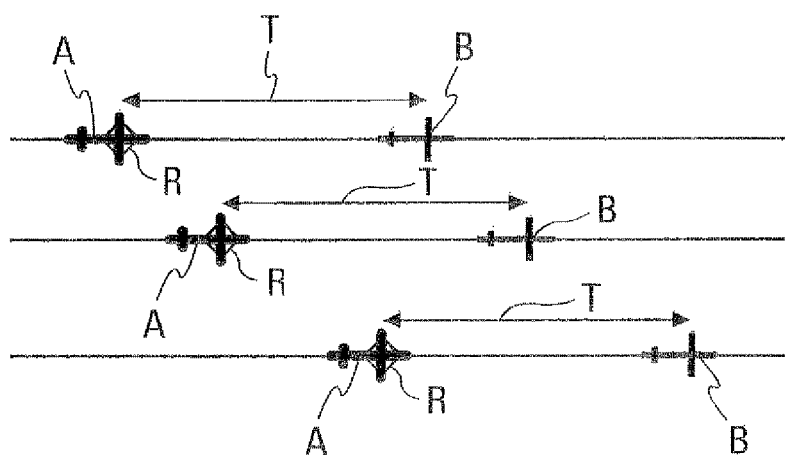
Fig. 3A
Fig. 3B
Fig. 3C
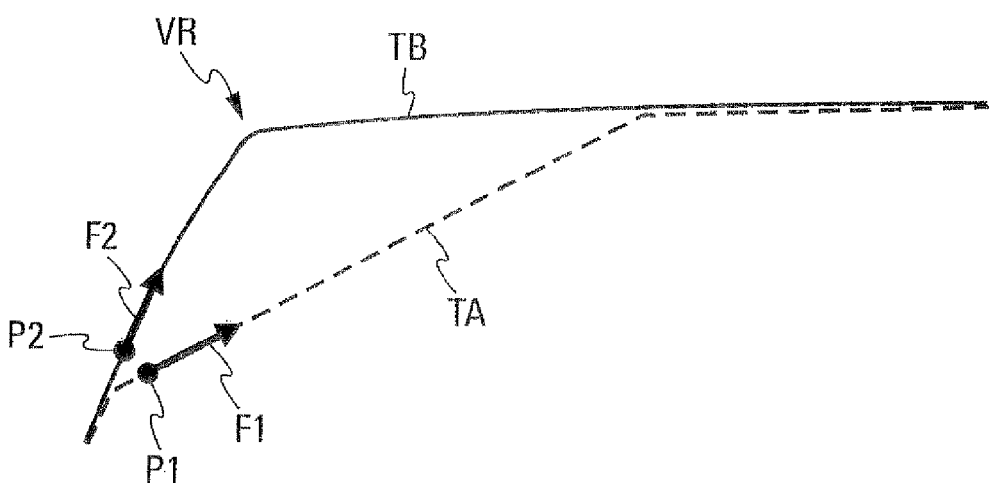
Fig. 7

METHOD AND DEVICE FOR AUTOMATICALLY MANAGING THE SEPARATION BETWEEN TWO AIRCRAFT FOLLOWING ONE ANOTHER

The present invention relates to a method and a system for automatically managing the separation of at least one aircraft, called the referent aircraft, behind at least one other aircraft, called the target aircraft, which precedes it.

The present invention can be applied to a cruise phase, in particular in order to fly a fleet of aircraft, for example transport aircraft, behind one another. It can also be applied to an approach phase for the purpose of a landing, in particular on an airport runway.

Regarding such an approach, it is known that because of the constant increase in air traffic, new methods are sought for preventing saturation of the most heavily loaded airport areas. One of these methods consists in delegating to one aircraft (following aircraft), in particular a transport aircraft, the automatic performance of a maneuver of separation with respect to another aircraft (followed aircraft) flying in front of it, in the terminal zones of air traffic control. For the implementation of such a method, an air traffic controller indicates to the following aircraft, using a usual radio communications system, which aircraft it must follow, the type of maneuver to carry out and the value of the separation to be complied with. The carrying out of such an automatic separation maneuver makes it possible to increase the landing and takeoff capacity of the runways of an airport, by optimizing the distances between the aircraft (on landing and on takeoff).

Through the document FR-2 925 711, there is known a method and a device for automatic guidance, during a landing procedure, of a following aircraft which is following a followed aircraft, with a particular separation in accordance with a separation maneuver. This method and this device make it possible to prevent inconvenient go-arounds, by automatically controlling, throughout the separation maneuver, the actual energy state of the following aircraft, in order that it remains compatible with the execution of an approach procedure for the purpose of a landing (if necessary with a limitation of the guidance orders relative to speed). As long as no incompatibility is detected, first guidance orders are applied to the following aircraft which make it fly at a speed allowing it to follow the followed aircraft with a separation conforming with the separation maneuver. On the other hand, when the energy state of the following aircraft becomes incompatible with the execution of a landing procedure, because of a speed that is too high, second guidance orders are applied to said aircraft which allow the carrying out of such a landing procedure. In such a situation of incompatibility, priority is thus given to maintaining the capability of landing to the detriment of maintaining a separation (with regard to a separation maneuver).

Moreover, through the document FR-2 925 710, there is known a method and a device for the modification of a flight path intended for a following aircraft. The purpose of this modification is to allow the following aircraft to move to a point of convergence of the flight path with a required separation with respect to an aircraft preceding it. If this flight path modification is applied, a distancing in heading of the following aircraft with respect to its initial flight path is carried out, in order that the following aircraft may waste time before returning to said initial flight path.

The purpose of the present invention is notably to manage the increase of air traffic, in particular by making it possible to help air traffic controllers to automatically construct and maintain trains of regularly and precisely separated aircraft, which allows an increase of capacity in the terminal air traffic control zone and a reduction of guidance instructions.

The present invention relates to a particularly efficient method intended for automatically managing the separation of an aircraft, called the referent aircraft, behind at least one other aircraft, called the target aircraft, which precedes it.

For this purpose, according to the invention, said method for automatically managing the separation of an aircraft called the referent aircraft behind at least one other aircraft called the target aircraft, a method according to which a principal function is implemented comprising an acquire and maintain function which makes it possible to automatically acquire and maintain a separation between that referent aircraft and the target aircraft, is noteworthy in that:

A/ even before the starting of the acquire and maintain function of said principal function, automatically:
  a) a movement of the target aircraft, prior to the current time, is determined;
  b) using this prior movement, speed control orders are calculated allowing the referent aircraft, when they are applied to it, to carry out the acquisition of a time separation with respect to the target aircraft; and
  c) the time necessary for carrying out this acquisition is calculated; and B/ from the start of said acquire and maintain function, the speed control orders thus calculated are applied to the referent aircraft so that it acquires said time separation. This time separation is then maintained after its acquisition.

Thus, thanks to the invention, there is calculated speed control orders allowing the referent aircraft to carry out the acquisition of a time separation (as well as the time necessary for carrying out this acquisition), even before the starting of an acquisition maneuver so that the latter can immediately be used during its performance, furthermore using precise values (the previous calculation of which has been able to be refined). The present invention thus anticipates the actions of pilots by activating the initialization of the aforesaid functions before starting a maneuver for acquiring and maintaining separation.

The speed control orders are such that they allow the referent aircraft (or following aircraft) to have the same position and the same speed that the target aircraft (or followed aircraft) had N seconds before the current time (or present time), N seconds corresponding to a predetermined period. Moreover, the referent aircraft carries out the following according to its own flight plan.

Four types of acquisition maneuver are, in particular, possible:
  a following (Remain Behind) maneuver: both aircraft initially having the same horizontal flight plan, the acquisition having to be completed within a reasonable time (time constraint);
  a convergence (Merge then Remain Behind) maneuver: both aircraft having a common flight plan after a merge (or convergence) point, the acquisition having to be completed no later than at this merge point (spatial constraint);
  a distancing and convergence (Vector then Merge Behind) maneuver: a flight management system calculates a distancing flight path for the referent aircraft (or following aircraft) followed by a convergence at a merge point, the acquisition having to be completed no later than at the merging point; and
  a following flight plan and convergence (Follow Route then Merge) maneuver: a flight management system calculates a flight path following its flight plan for the referent aircraft (or following aircraft), followed by a convergence at a merge point, the convergence being initiated at a time that is determined by the flight management system and the acquisition having to be completed no later than at this merge point.

Advantageously, in step A/a):

over said predetermined period prior to the current time, the successive real positions of the target aircraft at successive times are recorded and, in the case of absence of position information, successive fictitious positions of said target aircraft at said successive times are estimated and recorded; and the prior movement of the target aircraft is determined using the successive positions (real or fictitious) thus recorded.

Thus, an indication is available regarding the movement of the target aircraft, even before starting the acquire and maintain function, which makes it possible to anticipate the calculation of the speed control orders.

Moreover, this movement is calculated even in the absence of position information, notably by the estimation of successive fictitious positions of the target aircraft. In this case, in a first variant embodiment, the fictitious positions are estimated by assuming that the target aircraft is flying with a constant heading and at a constant speed (that is to say with a heading and speed identical to the current heading and speed respectively).

Moreover, in a second variant embodiment, applied to a following (Remain Behind) maneuver, an extrapolated flight path of the target aircraft is determined using the following operations:

the next N waypoints on the flight path of the referent aircraft are taken into account, these waypoints also belonging to the flight plan of the target aircraft (for a following maneuver), N being an integer greater than 1, for example 10.

using the current position and heading of the target aircraft, it is positioned with respect to these waypoints; and the flight path passing through all of the waypoints that the target aircraft has already sequenced at the current time is determined as an extrapolated flight path.

A more realistic and therefore more precise extrapolation of the flight path followed by the target aircraft during the following (Remain Behind) maneuver is thus obtained.

Moreover, advantageously, in step A/b), said speed control orders of the referent aircraft are calculated, if necessary, from a position difference between the target and referent aircraft, from the speed and the acceleration of the referent aircraft and from limitations making it possible to carry out operational adaptations, notably in order to adapt them to specific acquisition maneuvers, such as a convergence maneuver of the "Merge" type or a following maneuver of the "Remain Behind" type.

Moreover, advantageously, in step A/b), adjustments of the speed control orders are carried out in order to take account of a speed modification process of said principal function, by compensating for the delay between the time of a speed command and the time that this speed command is actually carried out.

Moreover, advantageously:

in order to increase the duration of the separation likely to be used, there is recorded only one sample out of P items of data relative to the target aircraft, all of which have been taken into account for a filtering, P being an integer greater than 1; and/or in order to obtain a management of the commanded speed which is robust with regard to wind conditions in the maneuvers of convergence, of distancing and convergence or of following the flight plan and convergence, a mean relative wind is used, as seen by the referent aircraft on its flight path up to a merge point, in order to calculate the speed control orders of said referent aircraft; and/or when performing the maneuver, in order to avoid accelerations of the referent aircraft which are useless, costly and uncomfortable for the crew and the passengers, the current evolution of the speed of the target aircraft is analyzed in real time and the speed of the referent aircraft is optimized so as to approach the speed of the target aircraft whilst reducing the accelerations and decelerations.

Moreover, in a preferred embodiment, a secondary function is furthermore implemented, which cooperates with said principal function and which makes it possible to manage automatically, before and after the start of said function of acquiring and maintaining of separation function, the feasibility of a maneuver for acquiring and maintaining separation between the referent aircraft and the target aircraft, carried out by said principal function. In particular:

before the start of a maneuver and during the acquisition phase, the secondary function carries out a check relating to the capability of acquiring the requested separation; and during the maintaining phase, said secondary function carries out a check relating to the capability of maintaining the separation within predetermined tolerances.

Advantageously, when said secondary function detects that an acquire and maintain separation maneuver is not feasible, it sends a warning, notably a visual warning, for example by commanding a particular display on a display screen in the cockpit.

Moreover, advantageously, when said secondary function detects that an acquire and maintain separation maneuver is only feasible if the speed control orders are modified, it determines an optimum speed profile which it transmits to said principal function, in order to adapt the speed control orders which are to be applied to the referent aircraft.

Moreover, advantageously:

said secondary function detects and provides the management of turns during the flight of the target and referent aircraft. As these aircraft can be of different types and/or can be using different navigation systems, it is possible that they do not take the turns in the same way for a same flight plan. The secondary function is formed for managing this situation; and/or said secondary function detects and provides the management of differences in the respective flight envelopes of the target aircraft and the referent aircraft.

Said secondary function therefore notably makes it possible:

to detect the case where the time separation cannot be held and to propose corrections if possible;

to cooperate with the principal function for adjusting, if necessary, its calculation of the speed control orders; and to inform the crew regarding the capability of carrying out or not carrying out a foreseen maneuver.

The present invention also relates to a system for automatically managing the separation between at least one referent aircraft behind at least one target aircraft.

According to the invention, this automatic management system which is installed on board the following aircraft and which is of the type comprising at least a first device for implementing a principal function comprising an acquire and maintain function which makes it possible to automatically acquire and maintain a separation between this referent aircraft and the target aircraft, is noteworthy in that said first device comprises:

first means for automatically determining, even before starting the acquire and maintain function of said principal function, a movement of the target aircraft prior to a current time;

second means for automatically calculating, before starting the acquire and maintain function, using the prior movement determined by said first means, speed control orders allowing the referent aircraft, when they are applied to it, to carry out the acquisition of a time separation with respect to the target aircraft, said speed control orders being applied to the referent aircraft at the time of starting said acquire and maintain function so that it carries out at least the acquisition of said time separation; and third means for automatically calculating the time necessary for carrying out this acquisition.

Moreover, in a preferred embodiment, said automatic management system furthermore comprises:

a second device for implementing a secondary function making it possible to automatically manage, before and after starting said acquire and maintain function, the feasibility of a maneuver to acquire and maintain the separation between the referent aircraft and the target aircraft, carried out by said first device; and/or warning means, as well as display means, as described below.

The present invention also relates to an aircraft which is provided with an automatic management system such as the one mentioned above.

The figures of the appended drawing will give a good understanding of how the invention may be embodied. In these figures, identical references denote similar elements.

FIG. 1 is the block diagram of a system according to the invention.

FIGS. 2A, 2B and 2C diagrammatically show different successive times of a procedure for acquiring a separation.

FIGS. 3A, 3B and 3C diagrammatically show different successive times of a system for maintaining a separation.

FIGS. 5 to 10 are graphs making it possible to explain important features of the present invention.

Figure 1:
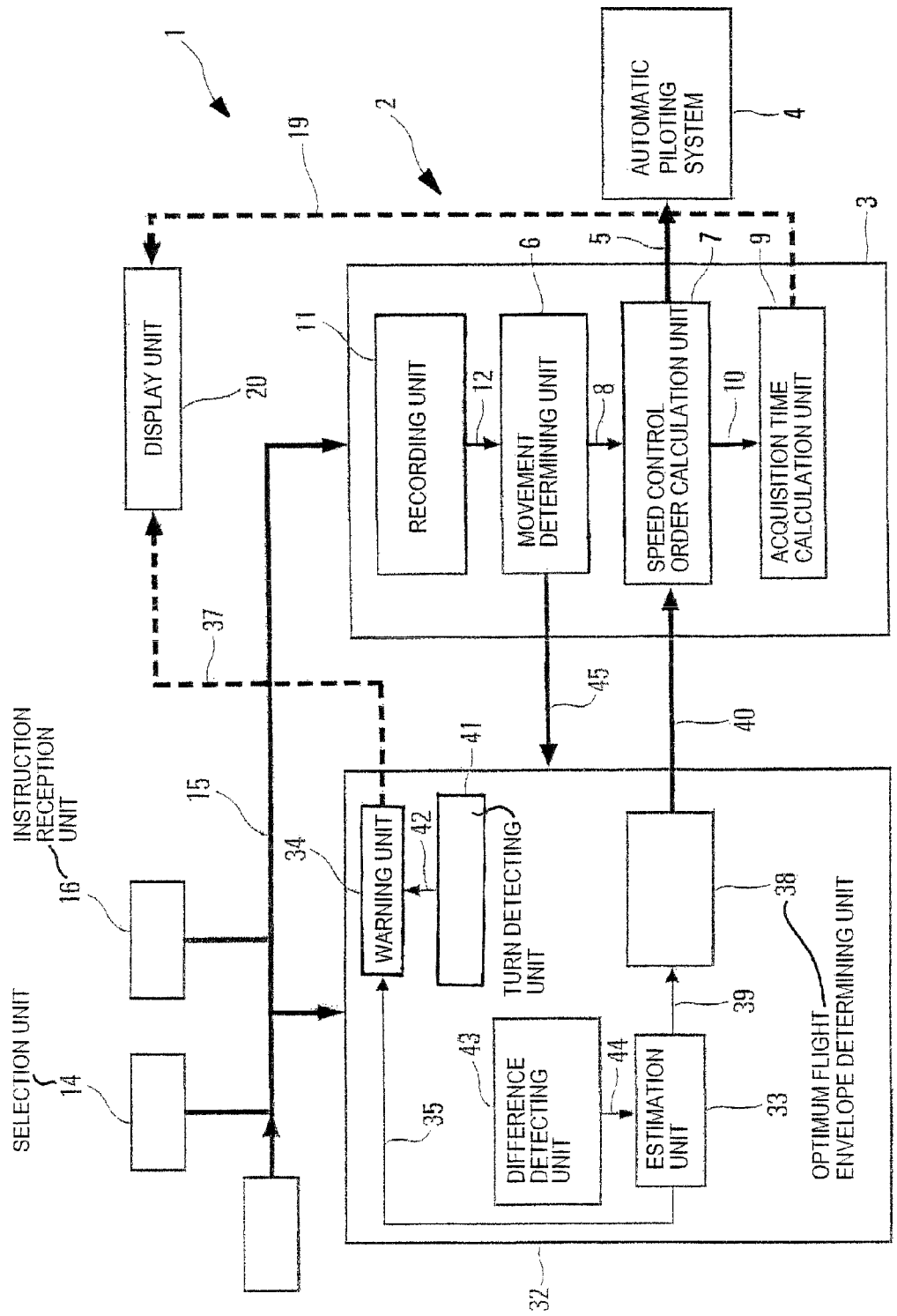

The system 1 according to the invention and shown diagrammatically in FIG. 1 is intended for automatically managing in flight the separation of an aircraft A, called the referent aircraft (or following aircraft), with respect to at least one other aircraft B, called the target aircraft (or followed aircraft), which precedes it. This automatic management system 1 which is installed in the referent aircraft A, in particular a civil or military transport aircraft, is notably intended to guide the latter in order that it carries out the following with a particular separation.

In order to do this, said system 1 comprises means 2 comprising a device 3 and a system 4 making it possible to use a principal function automatically. This principal function comprises an acquire and maintain function which makes it possible to automatically acquire and maintain a separation between the referent aircraft A and the target aircraft B, for example also a civil or military transport aircraft.

More precisely, said device 3 is intended to determine automatically speed control orders which are then transmitted (via a link 5) to an automatic piloting system 4 which applies them automatically, in the usual manner, to the referent aircraft A. It can also be considered that these speed control orders are used for producing a display intended to assist the pilot during manual piloting of the referent aircraft A.

According to the invention, said device 3 comprises:

means 6 for automatically determining, even before starting the acquire and maintain function of said principal function, a movement of the target aircraft B, prior to a current time;

means 7 which are connected by the intermediary of a link 8 to said means 6 and which are formed so as to automatically calculate, before starting the acquire and maintain function, using the prior movement determined by said means 6, speed control orders allowing the referent aircraft A, when they are applied to it, to carry out the acquisition of a particular time separation with respect to the target aircraft B. Said speed control orders are applied to the automatic piloting system 4 (via a link 5), and therefore to the referent aircraft A, as soon as said acquire and maintain function is started; and means 9 which are connected by the intermediary of a link 10 to said means 7 and which are formed so as to calculate automatically the time necessary for carrying out this acquisition, as described below.

More precisely, said device 3 is intended to determine automatically speed control orders which make it possible:

if it is not yet the case, to acquire a particular time separation T of N seconds, which is required by the separation maneuver; and as soon as this acquisition is completed, to maintain this particular time separation T. The speed control orders are therefore such that they allow the referent aircraft A (or following aircraft) to have the same position and the same speed that the target aircraft B (or followed aircraft) had N seconds before the current time (or present time), N seconds corresponding to said time separation T. Moreover, the referent aircraft A carries out this following according to its own flight plan.

FIGS. 2A, 2B and 2C show different successive times of a procedure for acquiring a time separation T, by the target aircraft A with respect to the target aircraft B (along a flight path TR). These successive times are separated by a same period. In order to carry out the acquisition, the referent aircraft A must, at the current time, be at a reference point R (which is mobile and illustrates a reference aircraft), to within a predetermined margin of error. The reference aircraft R corresponds to a fictitious aircraft which has the same position and the same speed that the target aircraft B had N seconds (period T) before the present time. This reference aircraft R therefore serves as a basis for the speed control. The acquisition is completed in the situation shown in FIG. 2C. Moreover, FIGS. 3A, 3B and 3C are diagrammatic illustrations of different successive times of a procedure for maintaining the previously acquired time separation T.

Thus, the device 3 of the system 1 according to the invention calculates speed control orders allowing the referent aircraft A to acquire a time separation T (as well as the time necessary for carrying out this acquisition), even before starting an acquisition maneuver, so that the latter can be implemented immediately, during its performance, furthermore using precise values (the prior calculation of which has been able to be refined). The system 1 thus anticipates the actions of the pilots by activating the initialization of the aforesaid functions before starting an acquisition and maintenance of separation maneuver.

Four types of acquisition maneuver are notably possible:

a following (Remain Behind) maneuver: the two aircraft initially have the same horizontal flight plan, the acquisition having to be completed within a reasonable time (time constraint);

a convergence (Merge then Remain Behind) maneuver: the two aircraft have a common flight plan after a merge (or convergence) point, the acquisition having to be completed no later than at this merge point (spatial constraint);

a distancing and convergence (Vector then Merge) maneuver: a flight management system of the referent aircraft A calculates a distancing flight path for that referent aircraft A (or following aircraft) followed by a convergence at a merge point, the acquisition having to be completed no later than at this merge point; and a following of the flight plan and convergence (Follow Route then Merge) maneuver: a flight management system of the referent aircraft A calculates a flight path of following its flight plan for this referent aircraft A (or following aircraft), followed by a convergence at a merge point, the convergence being initiated at a time which is determined by the flight management system and the acquisition having to be completed no later than at this merge point.

In order to know the position and the speed that the target aircraft B had N seconds before the present time, the system 1 must store its successive positions and do so over a period D0 which is longer than the maximum time separation likely to be requested. In order to do this, said device 3 comprises means 11 which are connected by the intermediary of a link 12 to said means 6 and which are formed so as to record, over the period D0 prior to the current time, the successive real position of the target aircraft A (at successive times), which are received from usual means, notably digital data transmission means, in particular of the ADS-B (Automatic Dependent Surveillance—Broadcast) type. The recording is carried out in a data register file, the new data replacing the oldest data.

Moreover, if these position values are not available, for any reason whatsoever, the means 11 estimate successive fictitious positions of said target aircraft B at said successive times, and then record them. In a particular embodiment, these fictitious positions are estimated by assuming that the target aircraft B is flying with a constant heading and at a constant speed (that is to say with a heading and speed respectively identical to the current heading and speed).

However, in a following (Remain Behind) maneuver, even with an identical flight plan, the target aircraft B and the target aircraft A cannot be on the same segment of this flight plan at a given time, and an extrapolation with a constant heading then results in an aberrant flight path of the target aircraft B, which falsifies the speed guidance.

Also, in a particular variant embodiment, applied to a following maneuver, the means 11 determine an extrapolated flight path of the target aircraft B, using the following operations:

they take into account the next N waypoints on the flight path of the referent aircraft A, these waypoints also belonging to the flight path of the target aircraft B (for a following maneuver), N being an integer, for example 10;

using the current position and heading of the target aircraft B, they position it with respect to these N waypoints taken into account; and they determine, as an extrapolated flight path, the flight path passing through all of the waypoints that the target aircraft B has already sequenced (at the current time).

In this way a more realistic and therefore more precise extrapolation of the flight path followed by the target aircraft B during a following (Remain Behind) maneuver is obtained.

Moreover, the duration of the separation (likely to be used by the present invention) between the referent aircraft A and the target aircraft B is limited in practice by the storage capacities (generally limited to 300 samples) of the means 11 for storing the past of the target aircraft B. In a basic embodiment, the data are recorded every second in order to obtain a separation which is then limited to 300s (for 300 samples), which is sufficient for the normal operations during the approach.

However, it can be advantageous to be able to have a longer period. Also, in a particular embodiment:

a filtering is carried out on all of the crude data samples (position, speed, . . . ) relative to the target aircraft B, in order not to have any loss of information. The purpose of this filtering is to process and refine the data by using similar data; but only one sample out of P items of raw data thus filtered is stored (in a memory of said means 11), P being an integer greater than 1 and for example equal to 5, which makes it possible to record the past of the target aircraft B over a longer period.

In order to do this, the memory used is divided into two sections, namely:

a small section (for example 40 to 50 samples out of 300 possible samples) which is used as a swap memory, to take account of all of the raw data samples received for the purpose of filtering; and the remainder which is used as a storage memory, for storing the filtered data (namely one sample out of P).

It is thus possible to manage longer separations, up to 1000s, whilst retaining the qualities of the filtering the latter being carried out on all of the samples.

The means 6 then determine the prior movement of the target aircraft B, using the successive positions (real and fictitious) thus recorded and received via the link 12.

The system 1 thus knows the characteristics of the movement of the target aircraft B, already before starting the acquire and maintain function, which makes if possible to anticipate the calculation of the speed control orders. Moreover, this movement is determined even in the absence of position information, by estimation of successive fictitious positions of the target aircraft B.

Thus, before starting the acquisition maneuver:

it is assumed that the aircraft chosen (selected) before this starting will become the target aircraft B and an artificial past of that chosen aircraft is created as soon as possible; and regarding storage and management:

if there is no data in the data register file, a fictitious past is created by assuming constant heading and speed; and if the crew changes the selected aircraft, the system 1 deletes the recorded data and creates a new artificial past corresponding to the new selected aircraft.

Moreover, after the starting, when the target aircraft B is confirmed, its data are immediately available. Moreover, the device 3 uses its future flight path to avoid useless excursions of the speed control by filtering the high frequencies of the target aircraft B. It takes full advantage of this knowledge by not introducing phase shift (forward and backward filtering).

Regarding the foreseen procedure, the crew, and notably the pilot of the referent aircraft A, carries out in particular:

the selection of the aircraft to follow (target aircraft B), generally when so instructed by the air traffic controller, using means 14 (which are connected to a data transmission link 15 notably connected to the device 3), for example a system of the ATSAW (Air Traffic Situational Awareness) type;

the reception of an instruction to follow the target aircraft B;

the selection of the maneuver to carry out and the acquisition of the parameters of the function (requested separation, heading, . . . ), using means 16 (which are connected to the data transmission link 15), for example a system of the MCDU (Multi-function Control and Display Unit) type; and the starting of the maneuver, for example using the means 14.

Moreover, in a particular embodiment (not shown), said system 1 can also comprise means which are formed in such a way as to automatically start the acquire and maintain function, if particular conditions are complied with.

Figure 4:
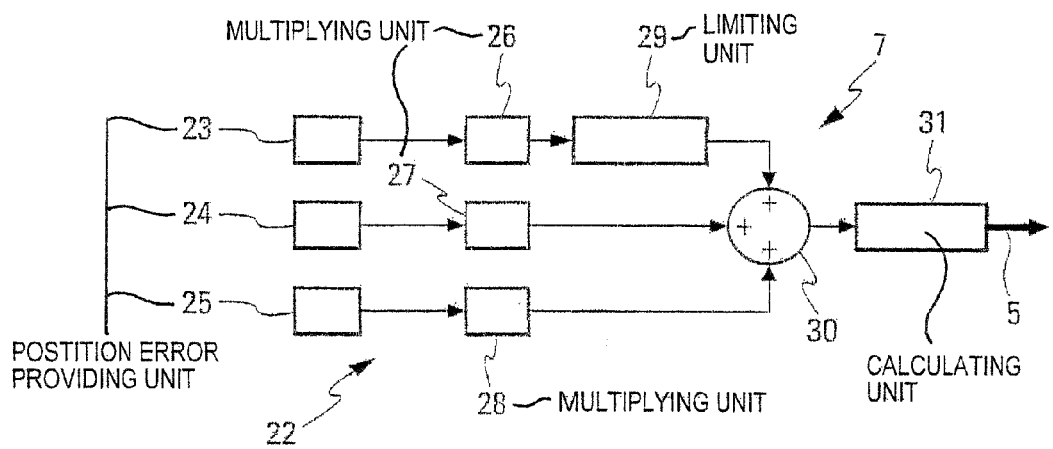
FIG. 4 is the block diagram of means of calculating speed control orders, forming part of a system according to the invention.

Moreover, said means 7 comprise means 22 for calculating the speed control orders of the referent aircraft A. As shown in FIG. 4, these means 22 comprise:

means 23, 24 and 25 for respectively providing the position error between the referent and target aircraft, A and B (that is to say the difference between the current position of the referent aircraft A and the corresponding position of the reference aircraft R), the current speed of the target aircraft B, and the current acceleration of said target aircraft B;

means 26, 27 and 28 which multiply the values received from the means 23, 24 and 25 respectively by respective gain values, the result provided by the means 26 furthermore being able to be limited by means 29;

calculation means 30 which produce the sum of the results coming from the means 27, 28 and 29; and calculation means 31 which can limit this sum and transmit the speed resulting from this through the link 5. This speed is transmitted directly to the dedicated computer (of the system 4) in the same way that a pilot would have done with the usual automatic guidance control devices.

The means 22 therefore calculate the speed control orders of the referent aircraft A, from a position difference between the target and referent aircraft, as well as the speed and the acceleration of the target aircraft B. These means 22 also comprise limits making it possible to carry out operational adaptations, notably in order to adapt them to specific acquisition maneuvers, such as a convergence maneuver of the "Merge" type or a following maneuver of the "Remain Behind" type. In fact, in order that the speed remains operationally compatible with what a pilot would have done, non-linearities are introduced into the law (limitations of the means 29 and 31). These dynamic saturations are adjusted during sessions with the pilots on simulators.

Figure 5:
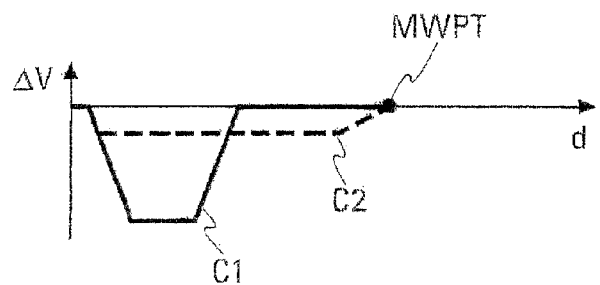
Figure 6:
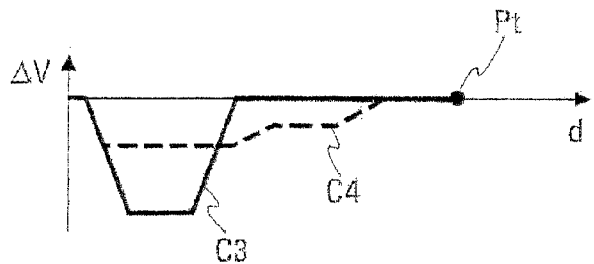

Thus, by way of illustration:

for a convergence maneuver of the "Merge" type, for which the acquisition must be done at the MWPT merge point (spatial constraint), the limitation used by the means 29 makes it possible to obtain an adapted speed over the period, as shown in FIG. 5 which illustrates the speed difference ΔV between the referent and target aircraft, A and B, according as a function of the distance d. In this FIG. 5, the curve C1 represents the raw command (no limitation) and the curve C2 represents the command obtained by the limitation. Thus, due to the limitation, the acquisition is carried out with a controlled speed excursion which is as gentle as possible; and for a following maneuver of the "Remain Behind" type, for which the acquisition must be completed within a reasonable time (time constraint illustrated by a point Pt), the limitation used by the means 31 makes it possible to obtain an adapted speed over the period, as represented in FIG. 6 which also shows the speed difference ΔV between the referent and target aircraft, A and B, as a function of the distance d. In this FIG. 6, the curve C3 represents the raw command (no limitation) and the curve C4 represents the command obtained by the limitation. Thus, due to the limitation, the commanded speed excursion with respect to the target aircraft B is limited.

In a particular embodiment, the basic speed law used by the means 7 works using ground speed. Thus:

at each time considered, the means 7 calculate the ground speed necessary to acquire and maintain the requested separation; and this ground sped is then converted (before its transmission through the link 5) into CAS speed using, in the usual way, the relative wind measured at the current time by the referent aircraft A.

This mode of calculation can however result, in high winds, in conventional speed excursions in the acquire and maintain maneuvers phase other than a maneuver of the "Remain Behind" type. In tact, when the referent aircraft A is not flying in a straight line towards the merge point, the relative wind that it encounters is different over the successive parts of its flight path. For a constant target ground seed, the target CAS speed thus varies all the more since the changes in the flight path of the referent aircraft A are marked. The conventional speed excursions resulting from this can be misunderstood by the crew and by the controllers on the ground.

Also, in order to increase the ease of use for the controllers and for the comfort of the passengers, provision is made, in a particular embodiment (which is applied to a convergence maneuver, to a distancing and convergence maneuver or to a following the flight plan and convergence maneuver), to take account of a constant CAS speed for the acquisition (and not of a constant ground speed).

In order to do this, the mean relative wind encountered by the referent aircraft A on its flight path up to the merge point in question is determined and the mean relative wind thus determined (which is therefore constant) is used in the processing (instead of using the wind measured at each calculation step).

In this particular embodiment, the separation that the referent aircraft A will have on the last section (or part) of its flight path before the merge point is also estimated and, if this separation is not correct, a correction is applied to the target CAS speed (in order to obtain the appropriate separation).

Thanks to this particular embodiment, management of the commanded speed is obtained which is robust with respect to wind conditions during the maneuvers of convergence, distancing and convergence and following the flight plan and convergence.

Moreover, said means 7 also comprise integrated means (not shown) for carrying out adjustments of the speed control orders, in order to take account of a speed modification process, compensating for the delay between the time of a speed command and the time of the actual carrying out of this command. Thus, so that the referent aircraft A has the same speed as the target aircraft B, the delay is removed from the reference speed before it is used in the law.

Moreover, the basic speed law (used by the means 7) guides the referent aircraft A towards a reference speed. In cases where the target aircraft B is in the process of changing speed on starting the maneuver used by the invention, this particular embodiment can result in accelerations of the referent aircraft A, which prove to be useless, costly (in terms of fuel consumption) and uncomfortable for the crew and the passengers.

In fact, by way of illustration, if on initialization the target aircraft B decelerates and the referent aircraft A is flying at a constant speed lower than that of the target aircraft B:
- an acceleration is firstly commanded for the referent aircraft A so that it achieves a target speed which is the speed that the target aircraft B had at a time prior to the current time (by a predetermined period);
- then, a deceleration is commanded for the referent aircraft A so that it can follow the target aircraft B (which decelerates to a later constant speed).

In the preceding example, the referent aircraft A would have been able to reach this later constant speed, without having to use all of the accelerations and decelerations that it was supposed to carry out.

Also, in order to overcome this disadvantage, means are provided for:
- analyzing in real time the current evolution of the ground speed of the target aircraft B, which represents the future evolution of the reference speed of the referent aircraft A; and
- the variation of the reference speed thus being able to be anticipated, the speed of the referent aircraft A is optimized in such a way that it approaches the speed of the target aircraft B by reducing the accelerations and the decelerations (at the time of performance of the maneuver).

It will be noted that this optimized embodiment has no impact on the acquisition performance for separations less than a predetermined duration, preferably 120s. Also, it is only used in this case.

Moreover, the system 1 also analyzes, as described below, the excursions of the speed of the target aircraft B out of the flight envelope of the referent aircraft A, and it can request to anticipate a change of speed in order to maintain the separation within the tolerances. This request will be taken into account in the commanded speed.

The separation is considered as being acquired when it comes within the predetermined tolerances around the requested value. Moreover, the means 9 are based on the knowledge of the speed which will be ordered, in order to estimate the time necessary to complete the acquisition. This value can be transmitted by the means 9, via a link 19, to display means 20, for example a system of the MCDU (Multifunction, Control and Display Unit) type.

Moreover, in a preferred embodiment, said automatic management system furthermore comprises a device 32 for implementing a secondary function making it possible to manage automatically, before and after starting said acquire and maintain function, the feasibility of a maneuver to acquire and maintain separation between the referent aircraft A and the target aircraft B, carried out by said device 3 (with which it cooperates). Said device 32 (which is notably connected by a link 45 to the means 6) comprises means 33 for estimating this feasibility.

In particular:
- before starting a maneuver and during the acquisition phase, said device 32 carries out a check regarding the capability of acquiring the requested separation; and
- during the maintaining phase, said device 32 carries out a check regarding the capability of maintaining the separation within predetermined tolerances.

Thus, for a following maneuver of the "Remain Behind" type:
- the separation must be acquired within a reasonable time, whilst limiting the large speed excursions commanded. A maximum period, for example of 5 min, is fixed for the acquisition;
- the countdown of time remaining for the acquisition is triggered on starting the maneuver;
- the time interval, daring which the referent aircraft A can carry out the acquisition, is estimated from the distance remaining for it to travel, taking account of the operational constraints such as speed limits that can be commanded; and
- the feasibility is acknowledged if the maximum authorized acquisition time is at least longer than the minimum possible time for carrying out this acquisition.

Moreover, for a convergence maneuver of the "Merge and Remain Behind" type:
- the separation must be acquired no later than at the merge point, that is to say that the referent aircraft A must arrive there N seconds after the target aircraft B, with a tolerance (for example of 5 seconds), without large excursions of the commanded speed;
- the time interval, during which the referent aircraft A must pass (required interval) through the merge point, is calculated continuously from the estimated time of arrival of the target aircraft B;
- the time interval, during which the referent aircraft A can pass through (feasible interval) the merge point, is also calculated continuously taking account of operational constraints such as speed limits that can be commanded; and
- the feasibility is acknowledged if an at least partial overlap exists between the required interval and the feasible interval.

Moreover, during the maintaining of separation phase, the checks carried out by the device 32 are the same whatever the type of maneuver may be. The purpose is to provide the crew with reliable information on the capability of maintaining the separation: when the referent aircraft A exits from the authorized separation range, the device 32 estimates the capability of returning to it within a reasonable (and specified) time.

This function is robust with regard to the following events, as explained below:
- the referent aircraft A and the target aircraft 13 do not entirely follow the same flight path during their respective turns;
- the vertical flight plans are not identical; and
- there are limited differences in operational capability.

When the means 33 detect that a maneuver for acquiring and maintaining separation is not feasible, they inform warning means 34 (via a link 35) which generate a warning, notably as visual warning which can, for example, be displayed by the means 20 (which are connected by a link 37 to the device 32). Moreover, when the means 33 detect that a maneuver of acquiring and maintaining separation is feasible only if the speed control orders are modified, they inform means 38 (via a link 39) which determine an optimum flight envelope. These means 38 then transmit this optimum flight envelop to the means 7 of the device 3 (by the intermediary of a link 40), so that the latter adapt the speed control orders, which are to be applied to the referent aircraft A.

Moreover, the device 32 also comprises means 41 for detecting turns during the flight of the target and referent aircraft and for providing their management. As the target and referent aircraft can be of different types and/or use different navigation systems, it is possible that they do snot take the turns in the same way for a same flight plan. In this case, one of the two aircraft can travel up to a few nautical miles more than the other, which can cause a temporary departure from the separation outside of the accepted tolerances. If this ease is not dealt with, a warning of the "ASAS SPACING: MISSED" type is transmitted during the temporary departure out of the tolerances, in particular on the means 20, whereas the separation will be regained after the end of the turn.

The means 41 (which are connected via a link 42 to the means 34) analyze the data of the target aircraft B and from it derive the position and the heading that the referent aircraft A should have if the two aircraft A and B had the same flight path. FIG. 7 shows the flight paths TA and TB of referent aircraft A and of the target aircraft B respectively during a turn VR.

If the real position P1 and the real heading F1 of the referent aircraft A are too distant from the position P2 and the heading F2 that they should have, the existence of a turn is declared. This results in:
- a temporary inhibiting of the aforesaid warning message "ASAS SPACING: MISSED";
- a more intense filtering of the separation displayed to the crew, in order that it does not exceed the tolerances and avoids alarming the crew uselessly; and
- an authorization to request greater speed differences for the device 3 in order to return to within the tolerated values as quickly as possible.

The exit from the "TURN" state is carried out in the following conditions:
- when the expected heading for the referent aircraft A and its real heading are similar, and the time separation between the two aircraft has returned to within the tolerances, which corresponds to a normal exit; or
- when the "TURN" state is declared for longer than a predetermined duration, for example longer than 5 min. This exit makes it possible to cover the case where the referent aircraft A does not return to the same flight path as the target aircraft B.

The device 32 therefore makes the system 1 robust with regard to temporary flight path differences.

Moreover, said device 32 detects and provides the management of differences in the respective flight envelopes of the target aircraft B and of the referent aircraft A. In order to do this, said device 32 comprises means 43 which are connected by the intermediary of a link 44 to said means 33 and which are capable of detecting differences in the respective flight envelopes.

If the two aircraft A and B do not have the same flight envelope, it can happen that the target aircraft B flies above the maximum speed Vmax or below the minimum speed Vmin of the referent aircraft A. In this case, the referent aircraft A cannot have the same speed as the target aircraft B and the separation can no longer be maintained.

Figure 8:
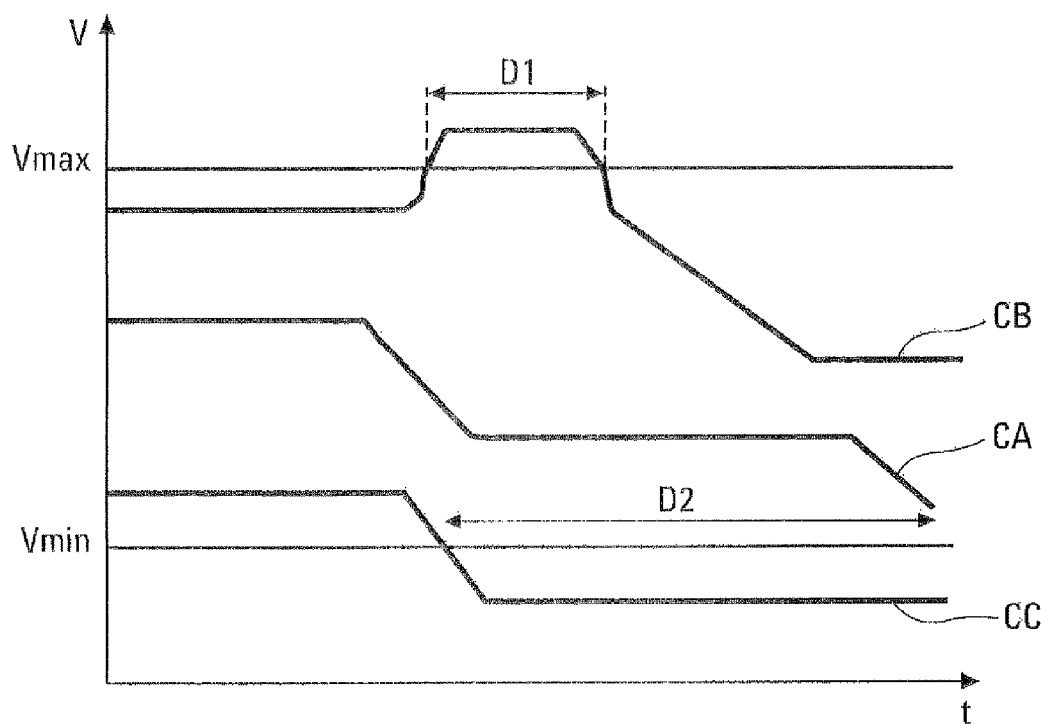

In order to know if the exceeding of the tolerances is temporary or not, the means 43 analyze the speed V of the target aircraft B by comparing it with said speeds Vmin and Vmax of the referent aircraft A. FIG. 8 shows the evolutions CA, CB and CC of the speed V (as a function of time t), representative of three different situations ca, cb and cc. More precisely:
- in the situation ca (speed CA), the target aircraft B never flies outside of the flight envelope (Vmin, Vmax) of the referent aircraft A. The separation can be maintained all of the time. No warning message is therefore sent;
- in the situation cb (speed CB), the target aircraft B flies outside of the flight envelope of the referent aircraft A, but only during a period D1 which is less than the limit duration of exiting. In this case, the separation exceeds the tolerances, but is rapidly regained. No warning message is sent; and
- in the situation cc (speed CC), the target aircraft B flies outside of the flight envelope of the referent aircraft A for a time D2 which is greater than the authorized time limit for exceeding. The separation will not be regained within a reasonable time lapse. A warning message is also sent.

Figure 9:
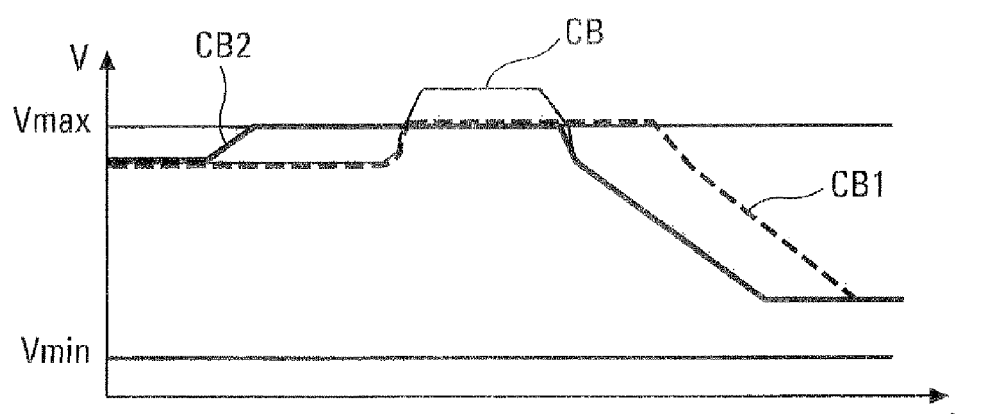

In the situation cb (exit from the flight envelope for a period D1), the separation can be regained, as shown in FIG. 9. This FIG. 9 also shows, plotted in thin continuous line, the evolution CB of the speed V (along the curvilinear x axis abs of the flight path followed) of the target aircraft B;
- in thick dashed line, the evolution CB1 of the speed V of the referent aircraft A, such as calculated by the device 3 (means 7); and
- in thick continuous line, the evolution CB2 of the speed V of the referent aircraft A, such as calculated by the device 32 (means 38).

Thus, with the normal speed law of the device 3, the separation difference is not anticipated. On the other hand, the device 32 calculates the speed that it is necessary for the referent aircraft A to use in order to anticipate the separation difference and it communicates this to said device 3 (via the link 40).

Figure 10:
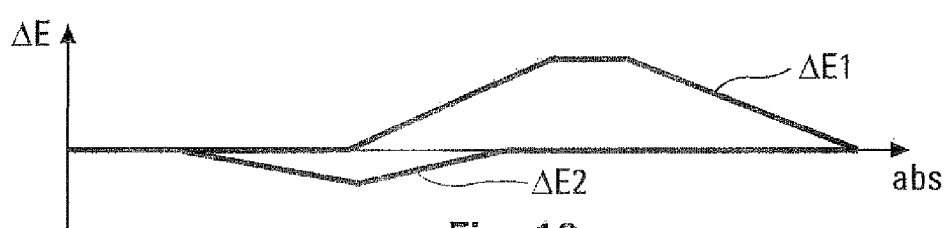

The device 32 therefore makes it possible to distribute the differences with respect to the requested separation better, as shown in FIG. 10. This FIG. 10 shows the separation differences ΔE (with respect to the required separation) along the curvilinear x axis abs of the flight path followed, namely:
- the separation difference ΔE1 corresponding to the evolution CB1 (FIG. 9); and
- the separation difference ΔE2 corresponding to the evolution CB2 (FIG. 9).

The device 32 therefore notably makes it possible:
- to detect cases where the time separation cannot be maintained and to propose corrections if possible;
- to cooperate with the device 3 in order to adjust, if necessary, its calculation of the speed control orders; and
- to inform the crew of the capability or incapability of carrying out a foreseen maneuver.

The invention claimed is:

1. A method for automatically managing separation of an aircraft called the referent aircraft following behind along a same flight path at least one other aircraft called the target aircraft during one of a cruise phase or a landing approach phase, the method including a principal function that is implemented comprising an acquire and maintain function which makes it possible to automatically acquire a time separation (T) between the referent aircraft and the target aircraft and maintain the time separation (T) while following along said same flight path, the method comprising:
performing, on a system including a processor and a storage unit installed on the referent aircraft, operations comprising:
A) even before starting of the acquire and maintain function of said principal function, automatically:
a) determining a prior movement comprising real position and speed of the target aircraft along said same flight path, over a time period of N seconds immediately prior to the current time by storing successive real positions and speeds of the target aircraft along said same flight path over said time period immediately prior to the current time, said time period being longer than said time separation (T) and storing said prior movement in the storage unit;

b) calculating, by a processor, using said prior movement, speed control orders allowing the referent aircraft, when said speed control orders are applied thereto, to start the acquire and maintain function so as to achieve acquisition of said time separation (T) with respect to the target aircraft, the time separation (T) relating to the referent aircraft following behind the target aircraft along said same flight path; and c) calculating, by a processor, the time necessary for carrying out said acquisition on the basis of the knowledge of the commanded speed according to said speed control orders, said necessary time being transmitted to a display unit; and B) applying to the referent aircraft, from the start of said acquire and maintain function, the speed control orders thus calculated so that the referent aircraft at least acquires said time separation (T).

2. The method as claimed in claim 1, wherein in step Aa):

over a predetermined period prior to the current time, the successive real positions of the target aircraft at successive times are recorded and, in the case of absence of position information, successive fictitious positions of said target aircraft at said successive times are estimated and recorded; and the prior movement of the target aircraft is determined using the successive positions thus recorded.

3. The method as claimed in claim 1, wherein in step Ab), said speed control orders of the referent aircraft are calculated, from a position difference between the target and referent aircraft, from the speed and the acceleration of the target aircraft and from limitations making it possible to carry out operational adaptations.

4. The method as claimed in claim 1, wherein, in step Ab), adjustments of the speed control orders are carried out in order to take account of a speed modification process of said principal function, by compensating for the delay between the time of a speed command and the time that this speed command is actually carried out.

5. The method as claimed in claim 1, wherein a secondary function is furthermore implemented, making it possible to manage automatically, before and after the start of said acquire and maintain function, the feasibility of a maneuver for acquiring and maintaining separation between the referent aircraft and the target aircraft, carried out by said principal function, and in that said secondary function carries out:

before the start of a maneuver and during the acquisition phase, a check relating to the capability of acquiring the requested separation; and during the maintaining phase, a check relating to the capability of maintaining the separation within predetermined tolerances.

6. The method as claimed in claim 5, wherein, when said secondary function detects that an acquire and maintain separation maneuver is not feasible, it sends a warning.

7. The method as claimed in claim 5, wherein, when said secondary function detects that an acquire and maintain separation maneuver is only feasible if the speed control orders are modified, it determines an optimum speed profile which it transmits to said principal function, in order to adapt the speed control orders which are to be applied to the referent aircraft.

8. The method as claimed in claim 5, wherein said secondary function detects and provides the management of turns during the flight of the target and referent aircraft.

9. The method as claimed in claim 5, wherein said secondary function detects and provides the management of differences in the respective flight envelopes of the target aircraft and the referent aircraft.

10. The method as claimed in claim 1, wherein in step Aa), an extrapolated flight path of the target aircraft his determined, which passes through all of the future waypoints of the flight plan of the referent aircraft, that the target aircraft has already sequenced.

11. The method as claimed in claim 1, wherein there is recorded only one sample out of P items of data relative to the target aircraft, all of which have been taken into account for a filtering, P being an integer greater than 1.

12. The method as claimed in claim 1, wherein a mean relative wind is used, as seen by the referent aircraft on its flight path up to a merge point, in order to calculate the speed control orders of said referent aircraft in step Ab).

13. The method as claimed in claim 1, wherein when performing the maneuver, the current evolution of the speed of the target aircraft is analyzed in real time and the speed of the referent aircraft is optimized so as to approach the speed of the target aircraft whilst minimizing the accelerations and decelerations.

14. A system for automatically managing separation of at least one aircraft called the referent aircraft, following behind along a same flight path at least one other aircraft called the target aircraft during one of a cruise phase or a landing approach phase, said system comprising at least a first device for implementing a principal function comprising an acquire and maintain function which makes it possible to automatically acquire a separation between the referent aircraft and the target aircraft and maintain the separation while following along said same flight path, said first device comprising:

a speed determiner that automatically determines, even before starting the acquire and maintain function of said principal function, a movement comprising real position and speed of the target aircraft along said same flight path at a given time prior to the current time by storing successive real positions and speeds of the target aircraft along said same flight path prior to the current time;

a processor that automatically calculates, before starting the acquire and maintain function, using the prior movement determined by said speed determiner, speed control orders allowing the referent aircraft, when said speed control orders are applied thereto, to start the acquire and maintain function so as to achieve acquisition of a time separation (T) with respect to the target aircraft, the time separation relating to the referent aircraft following behind the target aircraft along said same flight path, said speed control orders being applied to the referent aircraft at the time of starting said acquire and maintain function so that the referent aircraft carries out at least the acquisition of said time separation (T); and a processor that automatically calculates the time necessary for carrying out said acquisition on the basis of the knowledge of the commanded speed according to said speed control orders, said time being transmitted to a display unit.

15. The system as claimed in claim 14, wherein it furthermore comprises at least one of the following elements:

a processor for implementing a secondary function making it possible to automatically manage, before and after starting said acquire and maintain function, the feasibility of a maneuver to acquire and maintain the separation between the referent aircraft and the target aircraft, carried out by said speed determiner;
a warning apparatus; and
a display.

* * * * *